(12) United States Patent
Cho

(10) Patent No.: US 9,644,850 B2
(45) Date of Patent: May 9, 2017

(54) HEAT PUMP WATER HEATER

(71) Applicant: Young I. Cho, Cherry Hill, NJ (US)

(72) Inventor: Young I. Cho, Cherry Hill, NJ (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 14/844,295

(22) Filed: Sep. 3, 2015

(65) Prior Publication Data

US 2015/0377496 A1 Dec. 31, 2015

Related U.S. Application Data

(62) Division of application No. 13/639,135, filed as application No. PCT/US2011/031927 on Apr. 11, 2011, now Pat. No. 9,151,486.

(Continued)

(51) Int. Cl.
*F24D 17/00* (2006.01)
*F22B 1/28* (2006.01)
(Continued)

(52) U.S. Cl.
CPC ............ *F24D 17/0036* (2013.01); *F22B 1/28* (2013.01); *F22B 1/281* (2013.01); *F24D 17/02* (2013.01); *F24H 4/04* (2013.01); *F24H 9/2021* (2013.01); *F25B 27/00* (2013.01); *F25D 21/08* (2013.01); *F24D 2200/123* (2013.01)

(58) Field of Classification Search
CPC ................ F24D 17/0036; F24D 17/02; F24D 2200/123; F25D 21/08; F25B 27/00; F22B 1/281; F22B 1/28; F24H 9/2021; F24H 4/04
See application file for complete search history.

(56) References Cited

U.S. PATENT DOCUMENTS 3,918,268 A 11/1975 Nussbaum
4,399,664 A 8/1983 Deroiser
(Continued)

FOREIGN PATENT DOCUMENTS

JP 2008293068 A 12/2008

OTHER PUBLICATIONS

Liu, Z., et al.; "Study on Transient Distributed Model of Frost on Heat Pump Evaporator"; Journal of Asian Architecture and Building Engineering; May 2005, vol. 270, pp. 265-269.

*Primary Examiner* — Emmanuel Duke
(74) *Attorney, Agent, or Firm* — Mendelsohn Dunleavy, P.C.

(57) ABSTRACT

An energy efficient heat pump system capable of operating in extreme low and high temperature environments. The heat pump system includes an evaporator, a heater operatively associated with the evaporator, compressor and condenser. In an exemplary embodiment, the heat pump system may further include a plasma pulse-spark system to facilitate removal of scale deposits. The heater heats an environmental medium prior to the environmental medium exchanging energy with a refrigerant located in an evaporator coil of the evaporator in order to maintain a predetermined minimum temperature differential between the environmental medium when it contacts the evaporator coil and the refrigerant when located in the evaporator coil. The system allows efficient operation at low temperatures.

20 Claims, 7 Drawing Sheets

Related U.S. Application Data

(60) Provisional application No. 61/323,201, filed on Apr. 12, 2010.

(51) Int. Cl.

| | | |
|---|---|---|
| *F24H 4/04* | (2006.01) | |
| *F24H 9/20* | (2006.01) | |
| *F24D 17/02* | (2006.01) | |
| *F25B 27/00* | (2006.01) | |
| *F25D 21/08* | (2006.01) | |

(56) References Cited

U.S. PATENT DOCUMENTS

| | | | |
|---|---|---|---|
| 4,448,347 A * | 5/1984 | Dunstan | F25B 29/003 |
| | | | 165/909 |
| 4,517,807 A | 5/1985 | Harnish | |
| 4,882,908 A | 11/1989 | White | |
| 4,907,738 A | 3/1990 | Harris | |
| 4,940,079 A | 7/1990 | Best et al. | |
| 5,177,972 A | 1/1993 | Sillato et al. | |
| 5,207,075 A | 5/1993 | Gundlach | |
| 5,464,513 A * | 11/1995 | Goriachev | B01J 19/088 |
| | | | 204/164 |
| 5,630,915 A | 5/1997 | Greene et al. | |
| 5,776,334 A | 7/1998 | Cho | |
| 5,846,414 A | 12/1998 | Cho | |
| 5,916,490 A | 6/1999 | Cho | |
| 5,951,856 A | 9/1999 | Cho | |
| 6,113,779 A | 9/2000 | Snee | |
| 6,233,958 B1 | 5/2001 | Mei et al. | |
| 6,292,085 B1 | 9/2001 | Cho | |
| 7,159,416 B2 | 1/2007 | Park | |
| 7,159,419 B2 | 1/2007 | Syllaios et al. | |
| 7,244,360 B2 | 7/2007 | Cho | |
| 7,374,693 B1 | 5/2008 | Routbert et al. | |
| 7,434,414 B2 | 10/2008 | Sakitani et al. | |
| 7,543,456 B2 | 6/2009 | Sinha et al. | |
| 2002/0129615 A1 | 9/2002 | Ma et al. | |
| 2005/0120729 A1 * | 6/2005 | Zhang | F25B 9/008 |
| | | | 62/183 |
| 2006/0042251 A1 | 3/2006 | Villalobos | |
| 2006/0117768 A1 * | 6/2006 | Lee | F25D 21/08 |
| | | | 62/151 |
| 2007/0039929 A1 | 2/2007 | Buhler et al. | |
| 2007/0214818 A1 | 9/2007 | Nakamura | |
| 2008/0000247 A1 * | 1/2008 | Sinha | F24H 4/04 |
| | | | 62/238.7 |
| 2009/0105889 A1 | 4/2009 | Cowans et al. | |
| 2010/0000709 A1 | 1/2010 | Chang | |
| 2010/0012293 A1 | 1/2010 | Sinha et al. | |
| 2010/0031953 A1 * | 2/2010 | Penev | F24D 17/0021 |
| | | | 126/615 |

* cited by examiner (PRIOR ART)

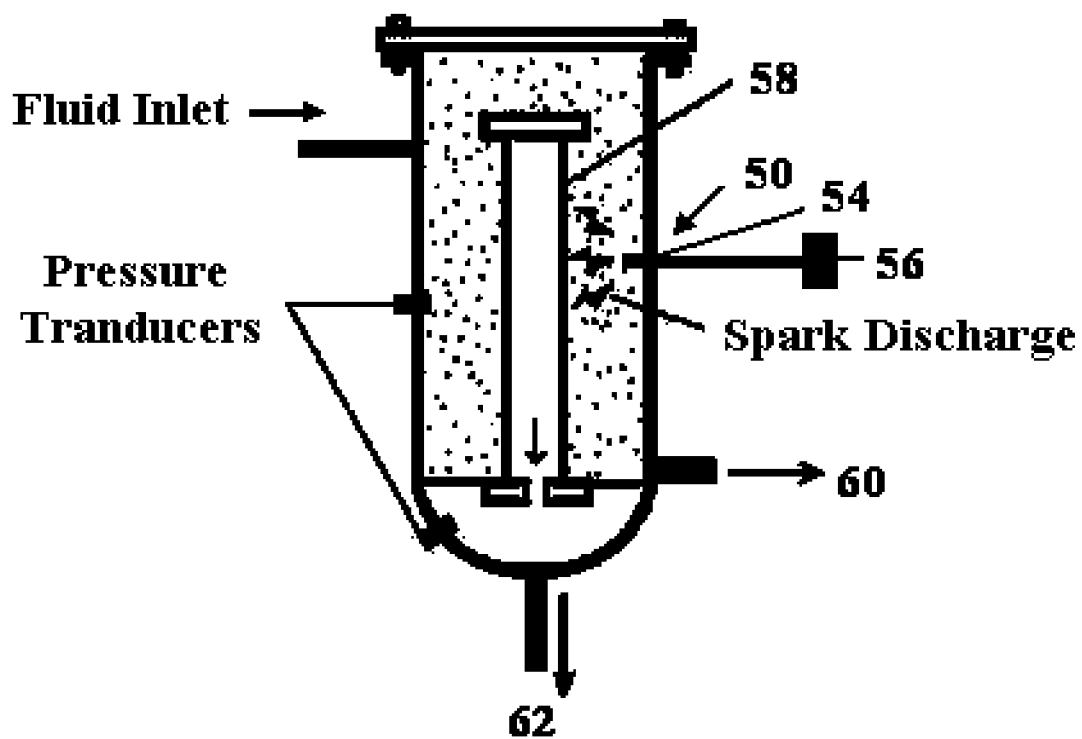

HEAT PUMP WATER HEATER

RELATED APPLICATION DATA

This application is a divisional of U.S. patent application Ser. No. 13/639,135, filed Oct. 3, 2012, which claims priority to International Appln. PCT/US2011/031927, filed Apr. 11, 2011, and U.S. Provisional Appln. No. 61/323,201, filed Apr. 12, 2010, the entire disclosure of which is hereby incorporated by reference as if set forth fully herein.

BACKGROUND OF THE INVENTION

1. Field of the Invention

The present invention is directed to an energy efficient heat pump system capable of operating in environments with significant temperature variations.

2. Description of the Related Technology

Conventional heat pump water heaters (HPWH's) use about one-third to about one-half as much electricity as conventional gas and electric resistance water heaters, which only have an efficiency of about 60% to about 95% and a coefficient of performance of about 0.9. The electricity consumed by these HPWH's is used to transfer heat rather than to generate heat, thereby enabling high energy efficiency. Conventional HPWH's, however, have a number of limitations that prevent widespread adoption. Specifically, conventional HPWH's are only operable within a limited temperature range and are not suitable for use in cold temperature climates.

The schematic diagrams of FIGS. 1(a)-1(b) illustrate why conventional HPWH's are unable to provide a sufficient amount of heat in cold temperature climates to heat a hot water tank. Using an R-22 refrigerant, the condenser temperature of the HPWH shown in FIG. 1(a) during the spring, summer and fall seasons reaches about 21 bars, which is sufficient to produce hot water. However, as shown in FIG. 1(b), during the winter season, the evaporator pressure falls below 5 bars due to a decrease in the temperature differential between the temperature of the surrounding environment and the temperature of the refrigerant. Consequently, the condenser pressure drops to 19 bars with a saturation temperature of approximately 49° C. The maximum hot water temperature that may be achieved under this condition is 40° C., which is substantially below commercially acceptable water heater performance levels. Therefore conventional HPWH systems are recommended for use only in areas where the minimum surrounding temperature is above 7° C. Conventional HPWH's therefore typically require a back-up electric heater for directly heating a hot water tank when the surrounding environmental temperatures become too cold to enable effective heat transfer to the hot water tank from the HPWH.

To address this issue, some HPWH systems contemplate various methods for increasing the temperature within the HPWH system. For example, U.S. patent application publication no. 2009/0105889 discloses the use of a thermal expansion valve and supplemental heat exchangers for this purpose, and U.S. Pat. No. 7,159,419 discloses the use of a friction heat generator driven by an expander for this purpose. These systems, however, are unable to efficiently increase the temperature within the HPWH system and/or sufficiently increase the refrigerant pressure in the HPWH system.

In other HPWH systems, such as that disclosed in U.S. Pat. No. 7,543,456, an electric heater is used to heat the air flowing through an evaporator. In these systems, the electric heater is designed to remove frost that has accumulated on the evaporator coil rather than heat the refrigerant within the evaporator coil. An automatic control means turns off the heater when defrosting is complete.

Another limitation of conventional HPWH's is the fact that their energy efficiency decreases over time as scale and contaminants accumulate on the surfaces of the HPWH. Scale is particularly problematic in hard water regions and can reduce the overall heat transfer coefficient by 50% to about 80%. Although some HPWH systems claim to reduce scale build-up by swirling the water within a water tank, research has shown that scaling is not substantially solved or mitigated merely by such swirling.

Accordingly, there is a need to develop an improved heat pump system that is energy efficient, capable of operating in low temperature as well as high temperature environments and, optionally, capable of mitigating or preventing scale build-up. These and other objects and aspects of the invention will be apparent from the summary and detailed descriptions which follow.

SUMMARY OF THE INVENTION

In a first aspect, the present invention relates to a heat pump system. The system includes an evaporator having an evaporator coil. A heater is operatively associated with the evaporator for heating an environmental medium prior to the environmental medium contacting the evaporator coil. The heat pump system further includes a compressor, a condenser, a refrigerant flow circuit connecting the evaporator, compressor and condenser and an energy transfer device for transferring energy between the refrigerant and a fluid.

In a second aspect, the present invention is directed to a method for operating a heat pump system at low ambient temperatures of about 5° C. or less. The method involves operating the heat pump system to transfer energy from an environmental medium to a refrigerant and then to subsequently transfer energy from the refrigerant to a fluid. The method further involves maintaining a temperature differential between the environmental medium when it contacts an evaporator coil of the heat pump system and the refrigerant when located in the evaporator coil of about 5° C. or more by heating the environmental medium prior to the environmental medium contacting the evaporator coil when a temperature of the environmental medium is less than about 5° C.

BRIEF DESCRIPTION OF THE DRAWINGS

FIG. 8 is a schematic diagram of one embodiment of a plasma pulse spark system.

DETAILED DESCRIPTION OF EMBODIMENTS OF THE INVENTION

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other apparatuses and methods. Before explaining the disclosed embodiments of the present invention in detail, it is to be understood that the invention is not limited in its application to the details of any particular embodiment shown. The terminology used herein is for the purpose of description and not of limitation. Further, although certain methods are described with reference to certain steps that are presented herein in certain order, in many instances, these steps may be performed in any order as may be appreciated by one skilled in the art, and the methods are not limited to the particular arrangement of steps disclosed herein.

It must be noted that as used herein and in the appended claims, the singular forms "a", "an", and "the" include plural references unless the context clearly dictates otherwise. Thus, for example, reference to "a heater" includes a plurality of heaters and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably.

For purposes of the present invention, "fluid" refers to any gaseous or liquid flowable heat transfer medium. Exemplary fluids include water, air and geothermal gases.

As used herein, "environmental medium" refers to any liquid or gaseous material of an environment. Exemplary environmental mediums include fluids, such as water, wind and air.

As used herein, "coefficient of performance" is a measurement of energy efficiency that refers to the ratio of useful heat produced by the heat pump system relative to the total amount of energy consumed by the heat pump system.

Figure 1A:
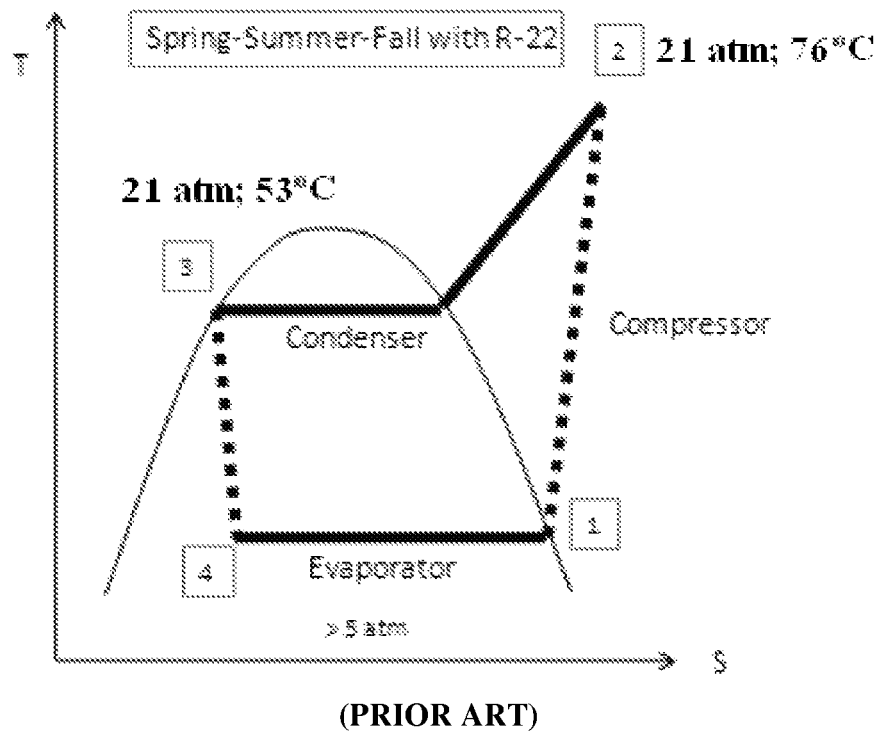
FIG. 1(a) is a graph of temperature as a function of entropy mapping the effectiveness of a conventional HPWH of the prior art using refrigerant R-22 at warm temperatures.
Figure 1B:
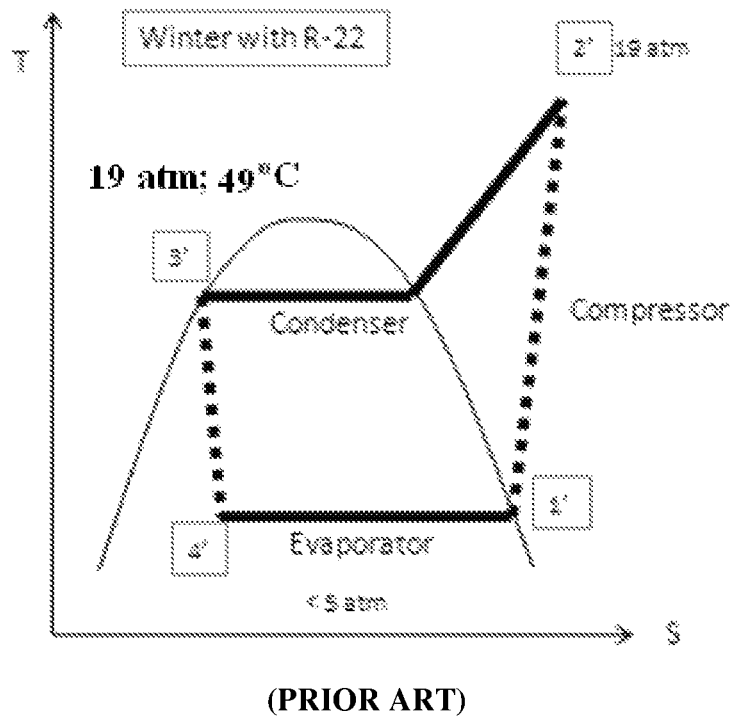
FIG. 1(b) is a graph of temperature as a function of entropy showing the effectiveness of a conventional HPWH of the prior art using refrigerant R-22 at cold temperatures.
Figure 2:
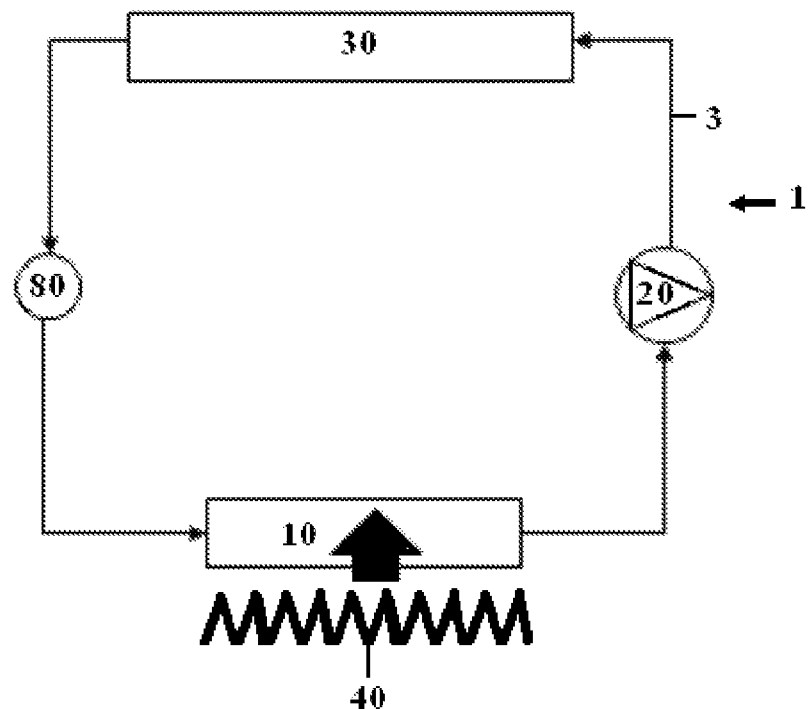
FIG. 2 is a schematic diagram of an exemplary heat pump system of the present invention.

The present invention is directed to an energy efficient heat pump system 1, shown in FIG. 2, which is capable of operating in both cold and warm temperature environments. Heat pump system 1 includes an evaporator 10, a compressor 20 and a condenser 30 connected in a heat transfer circuit. A heater 40 is operatively associated with evaporator 10 to enhance heat transfer efficiency and enable efficient operation of the heat pump system 1 in cold temperatures. Heat pump system 1 uses heat obtained from a surrounding environment to pressurize a refrigerant located within a vapor compression circuit 3. The refrigerant is subsequently used to heat or cool a fluid which may be fed to the system via a fluid inlet 5 shown in FIG. 7.

Optionally, heat pump system 1 includes a fluid reservoir 52 operatively associated with condenser 30 for storing a heat transfer fluid. Configured as a heating and/or a cooling system, heat pump system 1 is designed to heat a fluid when the ambient temperature is relatively cold and cool the fluid when the ambient temperature is relatively warm. In an exemplary embodiment, heat pump system 1 is an independent, stand-alone, energy efficient unit that is capable of operating in an environment where the ambient temperature may range from about −20° C. to about 60° C.

Heat pump system 1 may be compatible with any energy source and may heat or cool any gaseous or liquid fluid, such as air, water or geothermal fluids. Consequently, the present invention can be configured as an adsorption heat pump system, a geothermal heat pump system, an air source heat pump system or a heat pump water heater. For purposes of the present application, the detailed features and aspects of heat pump system 1 will be described in the context of a water source heat pump system. It is to be understood, however, that heat pump system 1 of the present invention may be routinely adapted to heat or cool any fluid medium or any energy source.

As shown in the exemplary embodiment of FIG. 2, heat pump system 1 includes an evaporator 10 that can be configured as a heat exchanger capable of drawing heat from a surrounding environmental medium and using it to heat and evaporate the refrigerant within vapor compression circuit 3. In an exemplary embodiment, evaporator 10 includes one or more evaporator coils 12 positioned within evaporator housing 16. Optionally, evaporator 10 can further include one or more fans 18 for directing an environmental medium into evaporator 10. As the heat is absorbed by the refrigerant, the refrigerant increases in enthalpy as it passes through one or more evaporators 10. During this process, the refrigerant at least partially evaporates, transforming into a gas via heat adsorption and exits evaporator 10. The temperature difference between the environmental medium in contact with evaporator coil 12 and the refrigerant within vapor compression circuit 3 drives the thermal energy transfer between the environmental medium and the refrigerant.

Heater 40, operatively associated with evaporator 10, is provided to increase the temperature of the environmental medium prior to contact between the environmental medium and evaporator coil 12. Heater 40 thereby enhances the temperature differential between the environmental medium and refrigerant so as to enable more efficient operation of heat pump system 1 by increasing the driving force for heat transfer between the environmental medium and refrigerant. In an exemplary embodiment, the use of heater 40 makes heat pump system 1 capable of maintaining a temperature differential between the environmental medium coming into contact with evaporator coil 12 and the refrigerant passing through evaporator 10 of about 5° C. or more, preferably, about 10° C. or more and most preferably, about 15° C. or more. By virtue of the presence of heater 40, heat pump system 1 is also capable of maintaining refrigerant pressure within the evaporator at or above about 5 bars, and maintaining refrigerant pressure within the condenser at or above about 21 bars, preferably, at or above 22 bars, using a R-22 refrigerant, irrespective of the temperature of the surrounding environment Heat pump system 1 can maintain the aforementioned temperature differential ranges and refrigerant pressure in cold temperature environments, such as when a dew point and/or temperature of said environmental medium is at or below 0° C. Heat pump system 1 can therefore utilize any low or high pressure refrigerants, including R-22 or R-134a, and can be operated over wide temperature ranges such as from about −20° C. up to about 60° C., or about −15° C. up to about 50° C. In addition to enabling operation at extreme temperatures, heater 40 can also be used to adjust the temperature of the environmental media in order to indirectly vary the temperature of the heated or cooled fluid or vary the amount of heat output at a given time.

Heater 40 can be any suitable device capable of heating the environmental medium prior to it coming into contact with evaporator coil 12. Exemplary heaters include but are not limited to heating elements, electric air heaters, resistance heaters, conductance heaters, convection heaters and gas.

In order to efficiently deliver the heat generated by heater 40 to evaporator coil 12, heater 40 is operatively associated with evaporator 10 by, for example, positioning heater 40 in close proximity to evaporator 10 in a manner whereby environmental medium pre-heated by heater 40 comes into contact with evaporator coil 12. Heater 40 may be integrally formed with evaporator 10 or a component thereof or heater 40 may be removably coupled to or associated with evaporator 10 or a component thereof. For example, heater 40 may form all or part of a surface of evaporator housing 16 or fan 18, positioned so that an environmental medium is heated prior to contacting evaporator coil 12. Heater 40, however, should not be positioned in contact with evaporator coil 12 or such that heat generated by heater 40 is directly transferred to evaporator coil 12 rather than to the environmental medium since such direct heat transfer from heater 40 to evaporator coil 12 would likely reduce the temperature differential between the environmental medium and refrigerant rather than increasing it as is desirable.

Heater 40 can also be integrally formed with or removably associated with heat pump system housing 70 or a conduit 72 designed to direct the environmental medium to evaporator 10, or a component thereof. When associated with housing 70 or conduit 72, heater 40 is preferably positioned in close proximity to evaporator coil 12.

Alternatively, heater 40 can be substantially spaced apart from but still efficiently convey heat to evaporator coil 12. In such embodiments, other means are employed to ensure efficient use of heated environmental medium for heat exchange with refrigerant in evaporator coil 12. For example, housing 70 or conduit 72 may be configured as a tunnel that directs heated environmental medium from heater 40 to evaporator coil 12 and may further include a fan 18 or other suitable means to facilitate movement of environmental medium from heater 40 to evaporator coil 12. Insulation may also be provided to reduce heat loss from the environmental medium to the environment en route from heater 40 to evaporator coil 12. To further facilitate operation in extreme cold and hot temperature environments, two or more heaters 40 can be arranged in a series or array.

Figure 3:
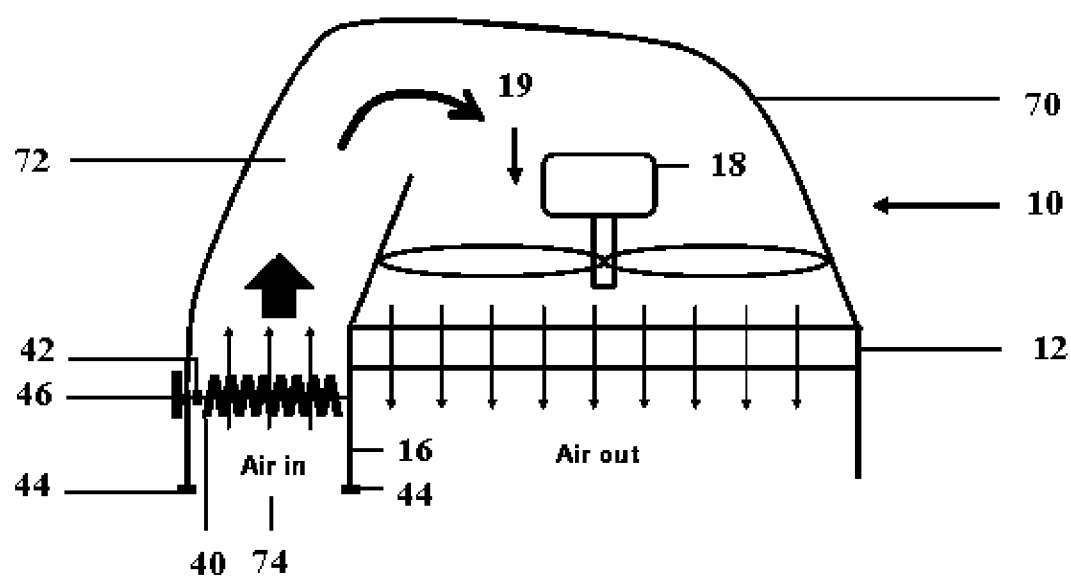
FIG. 3 is a schematic diagram of an one embodiment of an evaporator section of a heat pump system of the present invention showing the location of the heater relative to the evaporator.
Figure 4:
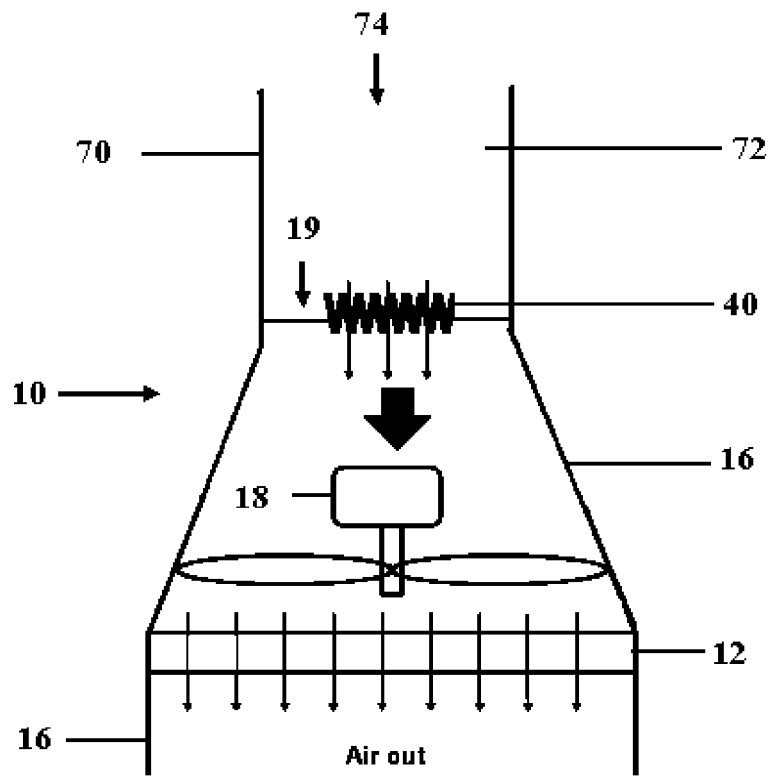
FIG. 4 is a schematic diagram of another embodiment of an evaporator section of a heat pump system of the present invention showing the location of the heater relative to the evaporator.
Figure 5:
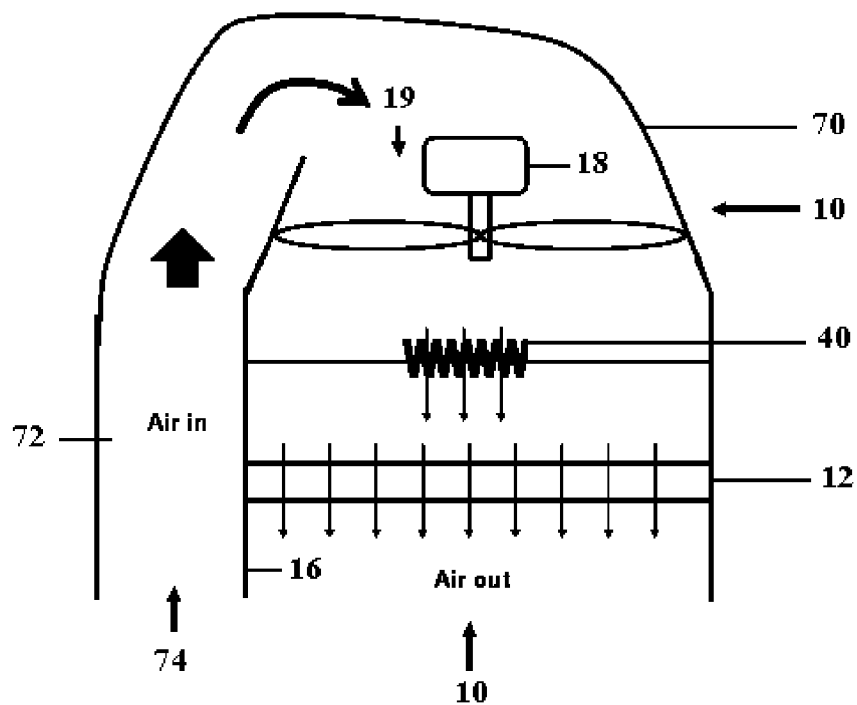
FIG. 5 is a schematic diagram of another embodiment of an evaporator section of a heat pump system of the present invention showing the location of the heater relative to the evaporator.
Figure 6:
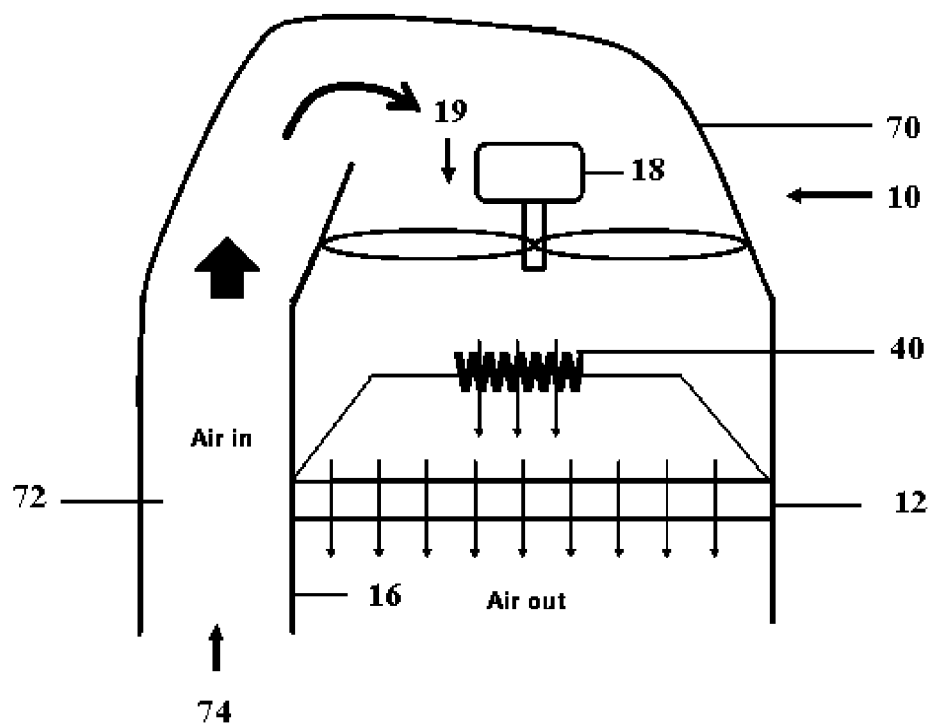
FIG. 6 is a schematic diagram of yet another embodiment of an evaporator section of a heat pump system of the present invention showing the location of the heater relative to the evaporator.

In the embodiment shown in FIG. 3, heater 40 is attached to and positioned within a conduit 72 defined by a surface of heat pump system housing 70 and a surface of evaporator housing 16. Conduit 72 is formed by wrapping a wall of heat pump system housing 70 around evaporator 10. Alternatively, as shown in FIG. 4, conduit 72 may be provided as a separate component, optionally defined by heat pump system housing 70 and attached to evaporator housing 16. As shown in FIG. 3, tubular conduit 72 connects openings 74, 19 and functions to guide an environmental medium through opening 74 of heat pump system housing 70 to opening 19 of evaporator housing 16. One or more heaters 40 can be positioned within any portion of conduit 72, including evaporator opening 19 or housing opening 74. As shown in FIG. 3, heater 40 is transversely situated within and spans the width of conduit 72 adjacent to housing opening 72. In alternative embodiments, such as those shown in FIGS. 4-5, heater 40 can be positioned adjacent to evaporator opening 19 or within evaporator 10. As shown in FIG. 6, heater 40 can also be attached to and spaced apart from evaporator coil 12, such that the heat generated by heater 40 is transferred to an environmental medium as it is directed toward evaporator coil 12. In an exemplary embodiment, heater 40 substantially spans the entire cross-sectional area of conduit 72 to ensure that an environmental medium entering heat pump system 1 is fully processed and heated by heater 40 prior to reaching evaporator coil 12.

As illustrated by the directional arrows in FIG. 3, the environmental medium is heated as it passes through and around heater 40. Movement of the environmental medium is facilitated by fan 18. Fan 18 can be positioned between evaporator coil 12 and heater 40. Alternatively, as shown in FIG. 6, heater 40 may be positioned between fan 18 and evaporator coil 12. The heated environmental medium, guided by the walls of conduit 72 and the force induced by fan 18, is conveyed to evaporator coil 12. As a by product of delivering heat to evaporator coil 12 via the intermediary environmental medium, the presence and operation of heater 40 may also be used to prevent the formation of frost on evaporator coils 12.

Heater 40 can be manually activated and deactivated. Heater 40 can also include a control system 42 programmed to automatically activate and/or deactivate heater 40 in response to an environmental condition, such as the temperature of the surrounding environmental medium. In one embodiment, control system is operatively associated with one or more temperature sensors 44 positioned on housing 70 proximate to evaporator 10. When the temperature of the surrounding environmental medium drops below a selected temperature, control system 42 activates heater 40. Similarly, upon detecting that the temperature of the environmental medium is above a selected temperature, heater 40 can be automatically deactivated. Heater 40 can also be connected to a clock or timer 46 and programmed so as to activate and/or deactivate at a select time and/or for a predetermined duration. For example, control system 42 may be programmed to activate heater 40 during the early morning hours and/or during particular seasons such as winter when temperatures are generally lowest. Combinations of these various heater control methodologies may also be used.

Upon exiting evaporator 10, the refrigerant is completely vaporized and circulated through compressor 20, where more heat is added to the refrigerant, making the refrigerant superheated. During this process, the entropy of vapor compression circuit 3 increases as heat is added to the refrigerant. The refrigerant is typically a high temperature superheated gas upon exiting compressor 20.

The refrigerant subsequently moves through one or more condensers 30 that enable thermal energy transfer from the refrigerant to the fluid. Upon absorbing heat from the refrigerant, the fluid is circulated to a desired location and used as a heat source. Condenser 30 can be any suitable heat exchanger that induces heat transfer to condense the superheated refrigerant. In one embodiment, condenser 30 may include one or more condenser tubes arranged in a series of coils to maximize the available surface area for heat transfer. The condenser tubes can be at least partially positioned within a fluid receptacle and enable heat transfer between the refrigerant within the condenser tube and the receptacle fluid. Exemplary condenser configurations can include one or more linear or coiled tubes having a single walled or double walled construction. Upon exiting condenser 30, the refrigerant is a cool, low enthalpy, high pressure liquid that moves through an optional expansion device 80 and can be subsequently re-circulated through heat pump system 1.

As described in FIG. 2, heat pump system 1 is configured as a heating system. By reversing the flow direction of vapor compression circuit 3, however, heat pump system 1 can also function as a cooling system designed to cool a fluid. Therefore, heat pump system 1 may be used as an efficient heating system during certain seasons as well as a cooling system during other seasons.

Figure 7:
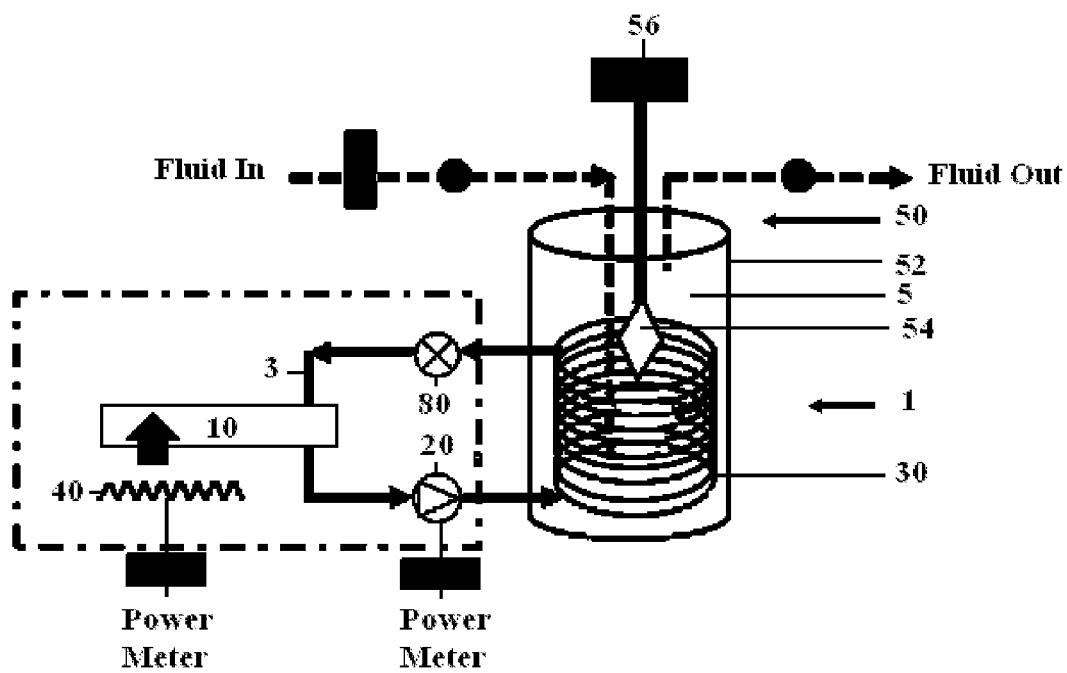
FIG. 7 is a schematic diagram showing a heat pump system in accordance with the present invention including a fluid reservoir.

As shown in FIG. 7, heat pump system 1 can further include an optional plasma pulse-spark system 50 that produces shock waves for precipitating mineral ions from the fluid, thereby mitigating or preventing the formation or accumulation of fouling deposits within heat pump system 1. Additionally, plasma pulse spark system 50 can be used to sterilize water and thus prevent biofouling via the growth of bacteria, algae and other microorganisms in the fluid, which can potentially degrade the performance of heat pump system 1. Plasma pulse-spark system 50 can be positioned at any location within the system for circulating fluid in the heat pump system 1 to prevent scaling.

As shown in FIG. 8, plasma pulse-spark system 50 includes one or more electrodes 54 coupled to a power source 56, a filter membrane 58 for separating precipitated contaminants from the fluid, a particle outlet port 60 and a fluid outlet port 62.

Referring to FIG. 8, electrode 54 can be constructed to have any suitable shape, size or configuration. Additionally, electrode 54 may be fabricated from any conductive material, including non-metallic materials, such as graphite, or metals. In one embodiment, electrode 54 has an arcuate, semi-circular or planar cross section. Optionally, one or more optional suspension rods, brackets or other supports can be used to stabilize electrode 54. Electrode 54 may further be positioned on any surface of heat pump system 1, such as an exterior wall of a condenser coil or an interior wall of a fluid reservoir 52, as shown in FIG. 8, so as to be in direct contact with the fluid. Since electrode 54 is placed in the fluid stream rather than on an exterior conduit or reservoir surface, plasma pulse spark system 50 is not restricted in terms of applied frequency, current, electrode placement or the dimensions of the component on which the electrode 54 is placed.

In the exemplary embodiment of FIG. 8, plasma pulse-spark system 50 is positioned within fluid reservoir 52. As shown, an electrode 54 is attached to an interior surface of fluid reservoir 52 and at least partially immersed in the fluid. Electrode 54 is preferably positioned at an upper or middle region of fluid reservoir 52 above filter membrane 58, particle outlet port 60 and fluid outlet port 62.

Upon applying a voltage to one or more electrodes 54, plasma spark pulses are discharged, producing an electric field and shock waves that precipitate mineral ions from the fluid, thereby preventing the formation and accumulation of fouling deposits. Exemplary plasma discharges include a pulsed corona discharge, a spark discharge, and gliding arc discharge. In one embodiment, electrodes 54 may transmit about 20 kV to about 40 kV per plasma spark pulse, wherein each pulse is about 10 µs to about 100 µs. In another embodiment, electrodes 54 may transmit about 70 J per liter of fluid 5 to effectively precipitate calcium ions in hard water, such as water having a $CaCO_3$ concentration of about 100 ppm to about 300 ppm.

The polarity of one or more electrodes 54 can be reversed at a controlled frequency to induce the formation of shock waves and an electric field. Preferably, the polarity of the electrodes 54 is reversed at a frequency between 500 Hz and 100,000 Hz. For example, a frequency greater than 1,000 Hz may be used for a 12V signal and an output current of between 5 about 10 amperes. No seed crystals are necessary to induce precipitation of the mineral ions, which subsequently conglomerate by virtue of attraction between the charged particles. As shown in FIG. 8, the conglomerated particles are separated from the fluid by a filter membrane 58 and removed from heat pump system 1 via particle outlet port 60 while the fluid exits through fluid outlet port 62.

In view of the advantageous features of heat pump system 1, such as heater 40 and plasma pulse spark system 50, heat pump system 1 is a highly energy efficient system that is capable of operating in extreme temperature environments. In an exemplary embodiment, the coefficient of performance of the heat pump system 1 is at least about 2.2 or more when the heater and plasma-pulse spark system 50 are not activated. When the heater 40 is activated, the coefficient of performance is at least about 1.6 or more. The electric energy spent by heater 40 is substantially or fully recovered by evaporator coil 12 to heat the refrigerant within vapor compression circuit 3. In an exemplary embodiment, heat pump system 1 therefore can have an energy efficiency of up to and including about 350% or about 350% or more; consequently, for every unit of energy required to operate heat pump system 1, about 3.5 units of energy or more may be generated to heat the fluid.

Figure 9A:
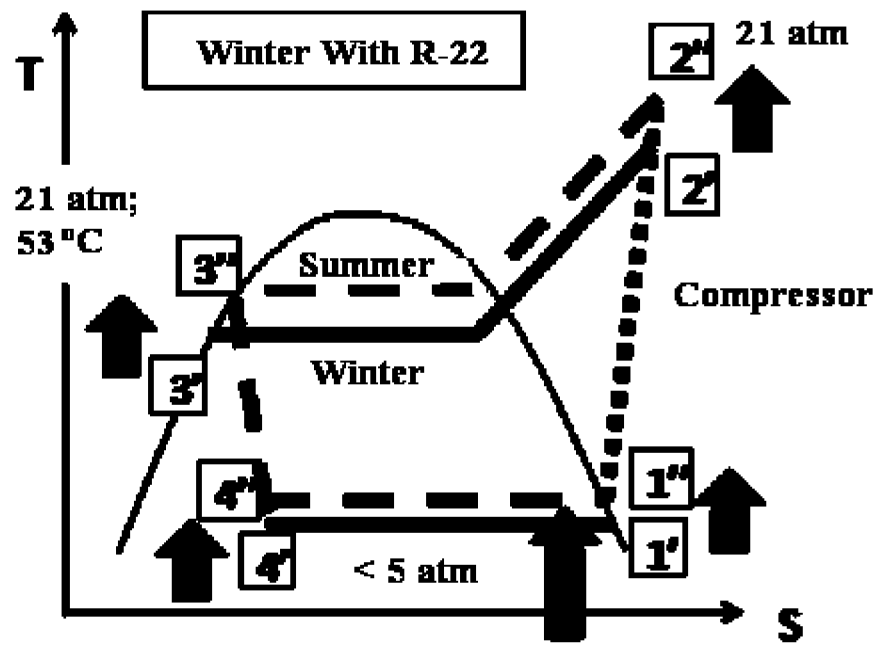
FIG. 9(a) is a graph of temperature as a function of entropy showing the effectiveness of the heat pump system of the present invention using refrigerant R-22 in cold temperatures.
Figure 9B:
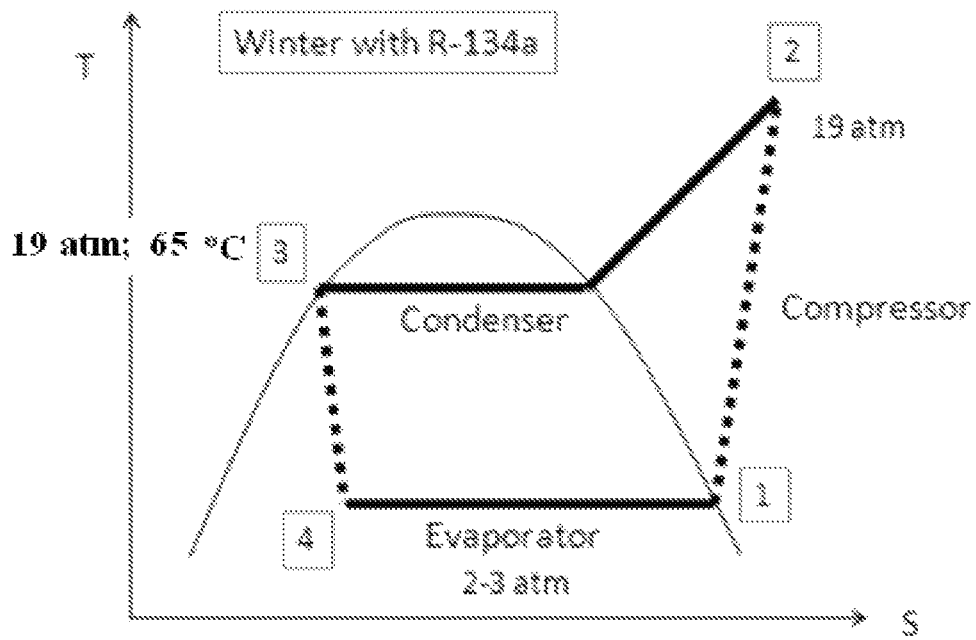
FIG. 9(b) is a graph of temperature as a function of entropy showing the effectiveness of the heat pump system of the present invention using refrigerant R-134A in cold temperatures.
Figure 10A:
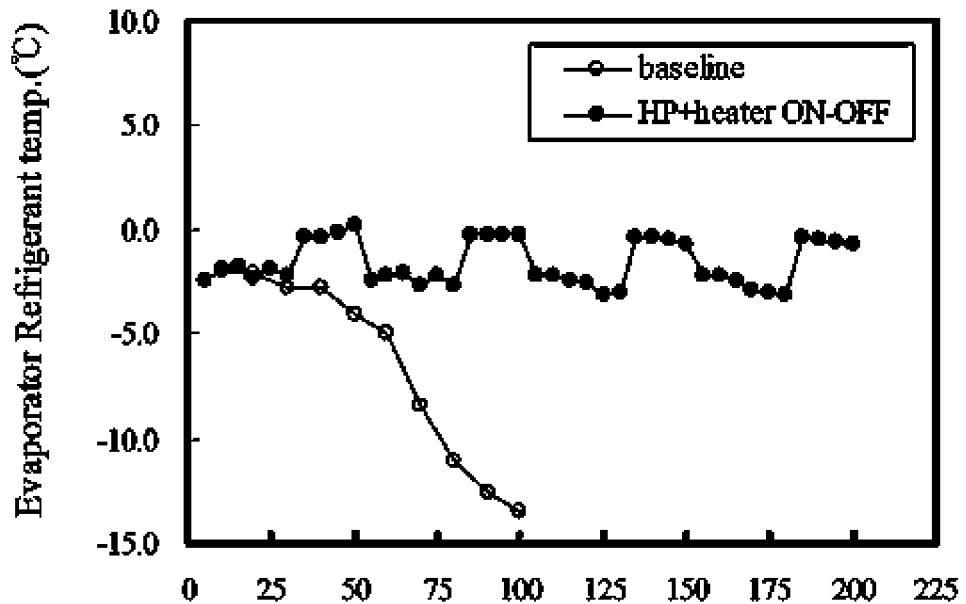
FIG. 10(a) is a graph of evaporation refrigeration temperature as a function of time showing test results achieved using a heat pump system of the invention.
Figure 10B:
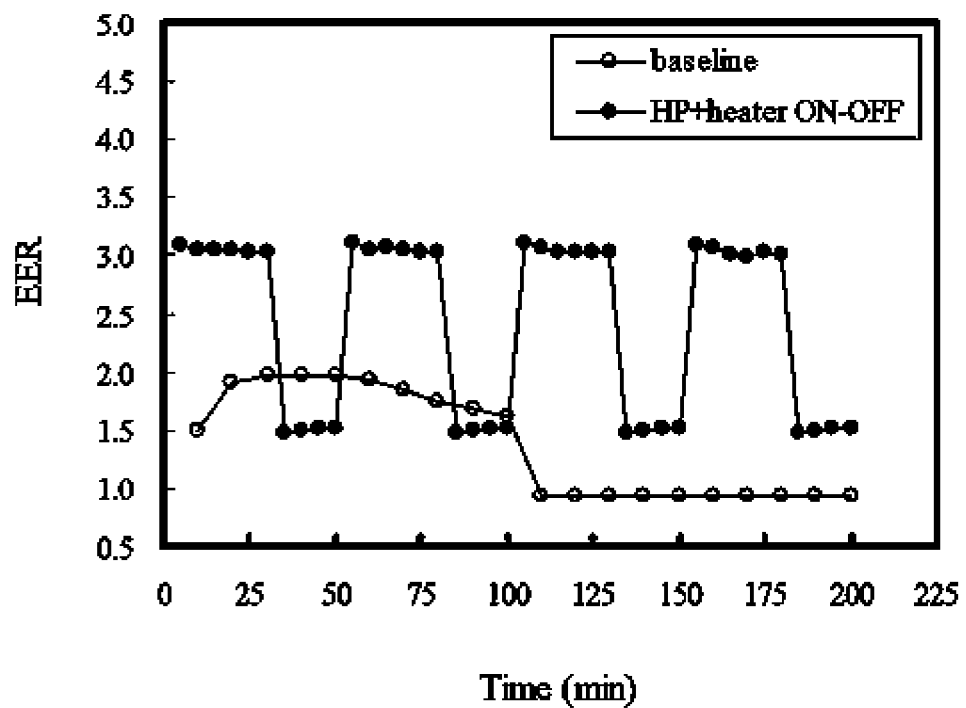
FIG. 10(b) is a graph of the energy efficiency ratio (EER) as a function of time showing the test results achieved using a heat pump system of the invention.

As shown in comparative FIGS. 9(*a*) and 9(*b*), energy efficiency can be increased by selecting a low temperature resistant refrigerant. FIG. 10(*a*) tracks the temperature of an R-22 refrigerant having a pressure of 19 bars within vapor compression circuit 3 as it is circulated within heat pump system 1. The entropy of the R-22 refrigerant is increased from 1" to 2" as the liquid refrigerant is heated within evaporator 10 with the help of the heater 40. Entropy increases between points 1" and 2" as the refrigerant enters compressor 20 and exits as a superheated vapor. Between 2" and 3", the thermal energy of the R-22 refrigerant is transferred to a water tank as the refrigerant is circulated through a condenser 30. During this process, the refrigerant is condensed, cooling in temperature and decreasing in entropy as it is transformed from vapor to liquid. Between 3" and 4", optionally, the refrigerant expands through the expansion device 80, thus the temperature of the refrigerant significantly drops, thereby further reducing entropy. The cycle is repeated when the refrigerant is recirculated through evaporator 10. As shown, heat pump system 1 with the help of the heater 40 using an R-22 refrigerant, evaporator 10 and condenser 30, pressures are 5 and 21 bars, respectively, on cold winter days. Heat pump system 1 therefore can achieve a condenser temperature of about 49° C. at 19 bars in cold temperature climates, sufficient for generating hot water. By comparison, as illustrated in FIG. 10(b), an R-134(a) refrigerant is capable of achieving a condenser saturation temperature of about 65° C. at 19 bars under the same environmental conditions. Therefore, by selecting a lower temperature resistant refrigerant, heat pump system 1 is capable of achieving even higher temperatures to facilitate the generation of hot water during cold winter days, as necessary for a particular climate.

Energy efficiency of heat pump system 1 can be further improved by adjusting the relative positions of heater 40 and evaporator coil 12 to ensure that substantially all of the heat generated by heater 40 conveyed and transferred to evaporator coil 12. In an exemplary embodiment, about 75% or more of the heat generated by heater 40 is delivered to evaporator coil 12, preferably about 80% or more, more preferably, about 90% or more and most preferably, about 95% or more. An insulating sleeve or casing can also be placed around conduit 72 and/or adjacent sections of housing 60 to prevent heat loss between heater 40 and evaporator coil 12.

In addition to the ability to efficiently operate in extreme low and high temperature environments, heat pump system 1 provides a number of other advantages. For example, heat pump system 1 can have a dual functionality, enabling use as both a heating and cooling system. Heat pump system 1 is also an environmentally responsible system that can use a renewable energy source, such as the ambient air in a garage, basement or utility room. As a byproduct of operating heat pump system 1, the room in which heat pump system 1 is installed is both cooled and dehumidified, reducing the occurrence of mold and mildew. Furthermore, since heat pump system 1 does not require the incorporation of a back-up electric water heater, it can be constructed as a compact stand alone device that is inexpensive to manufacture. Elimination of the back-up heater, also allows for the condenser coils to be placed within the fluid reservoir 52, thereby simplifying installation. If desired, however, heat pump system 1 can include one or more auxiliary heaters.

When heat pump system 1 is operated as a heating system, an environmental medium is drawn into evaporator 10 via heat pump housing 70 and/or conduit 72. Under certain conditions, prior to reaching evaporator coil 12, the environmental medium is heated by heater 40. By virtue of activating heater 40, heat pump system 1 can maintain a temperature differential between the environmental medium and the refrigerant of about 10° C. or more. Heater 40 can be manually adjusted to produce heat for a predetermined duration or at a predetermined temperature. Alternatively, heater 40 can be automatically activated or deactivated when the environmental medium surrounding heat pump system 1 is above or below a predetermined temperature. Heater 40 is preferably activated prior to the formation of frost, when the dew point and temperature of the environmental medium is at or below about 0° C. In addition to increasing the temperature differential between the environmental medium and the refrigerant, heater 40 may also be used to prevent the formation and build-up of frost on evaporator coil 12.

A refrigerant within vapor compression circuit 3 subsequently absorbs heat from the environmental medium and partially evaporates. As the refrigerant passes through compressor 20, more thermal energy is added and the refrigerant is superheated. The thermal energy of the refrigerant is subsequently transferred to the fluid within fluid tank 52 as it passes through and is pressurized by condenser 30. Optionally, the refrigerant may be further pressurized by an expander before recirculating through evaporator 10.

Optionally, heat pump system 1 may further include a plasma pulse spark system 50. Shock waves and an electric field are generated when an alternating voltage is applied to one or more electrodes 54, immersed in the fluid.

As a byproduct of operating heat pump system 1, the room in which heat pump system 1 is installed is both cooled and dehumidified, reducing the occurrence of mold and mildew. In one embodiment, the heat pump system may remove up to and including about 50 pints of moisture per day in a 10'×15' room and the cooling effect may be about 6,700 Btu/hr per kW. Optionally, a switching vane in air duct will be utilized such that during warm weather seasons, the cold air generated by heat pump system 1 is directed indoors, whereas during cold temperature seasons, the cold air generated by heat pump system 1 may be vented outdoors.

Additionally, heat pump system 1 can be run in reverse to function as a cooling system in a conventional manner.

Heat pump system 1 of the present invention may be used in a wide variety of heating and/or cooling applications. It is envisioned that heat pump system 1 can be scaled down or enlarged as necessary to for residential or industrial heating and cooling applications. Additionally, existing heat pump systems can be retrofitted to incorporate heat pump system 1 by inserting one or more heaters 40, optionally removing the back-up water heater, inserting a plasma spark pulse system 50 or combinations thereof.

EXAMPLE 1 AND COMPARATIVE EXAMPLE A

The performance of an exemplary heat pump system 1 was investigated in comparison to GE heat pump (model no. AZ55H12).

The GE heat pump using an R-22 refrigerant had a capacity of about 3.14 kW, power consumption of about 0.94 kW, and coefficient of performance of about 3.37. The GE heat pump was designed to shut down the compression when the outdoor temperature fell below about −4° C. in order to avoid oil-refrigerant separation at low temperatures, to protect the compressor and to prevent frost build-up on the evaporator coil, which stops air flow around the evaporator coil. Instead, the GE heat pump is designed to initiate a back-up electric water heater that produced about 2 kW of heat when temperatures fell below about −4° C. Due to the fan positioned at the condenser, the coefficient of performance was about 0.94 when the back-up electric heater was activated.

An exemplary heat pump system 1 in accordance with the present invention was constructed wherein a 1 kW electric air heater 40 was positioned in front of the evaporator coil of a GE heat pump (model no. AZ55H12). When the outdoor temperature fell below about −4° C., both the electric air heater 40 and the compressor 20 were turned on simultaneously. Heat pump system 1 was able to operate without accumulating frost build-up at the evaporator coil 12. The results of the experiment are provided in FIGS. 10(a)-10(b) and Table 1 below.

TABLE 1

Comparative performance of the GE heat pump and the heat pump of the present invention

| GE Model No. AZ55H12 Heat Pump | | Cap. (kW) | Power (kW) | C.O.P. | Evaporator Temp (° C.) |
|---|---|---|---|---|---|
| GE Heat Pump | −4.0° C. | 1.82 | 0.77 | 2.36 | −12.8° C. |
|  | −8.5° C. | 1.78 | 0.76 | 2.33 | −12.9° C. |
| Invention Heat Pump | −4.0° C. | 2.31 | 1.83 | 1.56 | −5.0° C. |
|  | −8.5° C. | 1.88 | 1.81 | 1.04 | −10.0° C. |

In heat pump system 1, the evaporator temperature rose by about 3° C. when the electric air heater 40 was activated in comparison to the conventional GE model when the electric air heater was not activated. Additionally, the coefficient of performance was recorded to be about 1.12 when the surrounding environmental temperature was about −10° C. when heat pump system 1 was operating stably, i.e. without frost build-up at the evaporator coil and without separation of oil and refrigerant. At about 2° C., the heat pump operated stably over an extended period of time and achieved a coefficient of performance of about 1.5, where the compressor power was slightly less than 1 kW. The experiment was repeated using different sized electric air heaters 40, and it was determined that coefficient of performance increased as the size of the electric air heater 40 increased beyond 1 kW.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meanings of the terms in which the appended claims are expressed.

What is claimed is:

1. A method for operating a heat pump system at low ambient temperatures of about 5° C. or less comprising the steps of:
   operating the heat pump system to transfer energy from an environmental medium to a refrigerant and subsequently transfer energy from said refrigerant to a fluid;
   maintaining a temperature differential between said environmental medium when said environmental medium contacts an evaporator coil of said heat pump system and said refrigerant when said refrigerant is located in said evaporator coil of about 5° C. or more by heating said environmental medium using a heater prior to the environmental medium contacting the evaporator coil when a temperature of said environmental medium is less than about 5° C. above a temperature of said refrigerant; and
   inducing a plasma discharge in said fluid sufficient for producing shock waves that cause precipitation of mineral ions from said fluid and generating an electric field in said fluid.

2. The method of claim 1, wherein said environmental medium is heated prior to the environmental medium contacting the evaporator coil when a temperature of said environmental medium is less than about 10° C. above a temperature of said refrigerant.

3. The method of claim 1, wherein the coefficient of performance of said heat pump system is at least about 1.6 when said heat pump system is operated at low ambient temperatures of about 5° C. or less.

4. The method of claim 1, wherein the energy efficiency of said heat pump is improved as compared to the energy required to operate the heat pump when said heat pump system is operated at low ambient temperatures of about 5° C. or less.

5. The method of claim 1, further comprising the step of activating the heater to heat said environmental medium when said temperature of said environmental medium drops below a predetermined temperature.

6. The method of claim 5, wherein said step of activating said heater occurs prior to the formation of frost on said evaporator.

7. The method of claim 1, further comprising a step of separating precipitated contaminants from the fluid using a filter membrane after said generating step.

8. The method of claim 7, wherein said plasma discharge is selected from the group consisting of: pulsed corona discharge, spark discharge and gliding arc discharge.

9. The method of claim 7, further comprising the step of precipitating ions from said fluid as a result of said plasma discharge and said electric field.

10. The method of claim 1, wherein said heating step is conducted while said environmental medium is being transported to said evaporator coil.

11. The method of claim 1, wherein said heater is located sufficiently close to said evaporator coil such that at least 75% of heat generated by said heater is transferred by said environmental medium to said evaporator coil.

12. A method for operating a heat pump system at low ambient temperatures of about 5° C. or less comprising the steps of:
   operating the heat pump system to transfer energy from an environmental medium to a refrigerant and subsequently transfer energy from said refrigerant to a fluid;
   activating a heater to heat said environmental medium when a dew point and temperature of the environmental medium is at or below about 0° C. prior to said environmental medium contacting an evaporator coil of said heat pump system containing said refrigerant; and
   inducing a plasma discharge in said fluid sufficient for producing shock waves that cause precipitation of mineral ions from said fluid and generating an electric field in said fluid.

13. The method of claim 12, wherein the coefficient of performance of said heat pump system is at least about 1.6 when said heat pump system is operated at low ambient temperatures of about 5° C. or less.

14. The method of claim 12, wherein the energy efficiency of said heat pump is improved as compared to the energy required to operate the heat pump when said heat pump system is operated at low ambient temperatures of about 5° C. or less.

15. The method of claim 12, wherein said step of activating said heater occurs prior to the formation of frost on said evaporator.

16. The method of claim 12, further comprising a step of separating precipitated contaminants from the fluid using a filter membrane after said generating step.

17. The method of claim 16, wherein said plasma discharge is selected from the group consisting of: pulsed corona discharge, spark discharge and gliding arc discharge.

18. The method of claim 16, further comprising the step of precipitating ions from said fluid as a result of said plasma discharge and said electric field.

19. The method of claim 12, wherein said heating step is conducted while said environmental medium is being transported to said evaporator coil.

20. The method of claim 12, wherein said heater is located sufficiently close to said evaporator coil such that at least 75% of heat generated by said heater is transferred by said environmental medium to said evaporator coil.

* * * * *